United States Patent [19]

Blackmore et al.

[11] Patent Number: 5,695,373

[45] Date of Patent: Dec. 9, 1997

[54] PREFORMED UNITARY COMPOSITE FOR REINFORCING WHILE SUPPRESSING CURL IN BITUMINOUS ROOFING MEMBRANES AND PROCESS FOR MAKING SUCH COMPOSITES

[75] Inventors: Phillip W. Blackmore, Fenwick; Charles Peter Skelton, Niaagara Falls, both of Canada

[73] Assignee: Bay Mills Limited, Ontario, Canada

[21] Appl. No.: 713,346

[22] Filed: Sep. 13, 1996

[51] Int. Cl.$^6$ .................. B32B 11/02; B32B 5/12
[52] U.S. Cl. .................. 442/57; 442/58; 156/62.4; 156/167; 156/181; 156/308.2
[58] Field of Search .................. 442/57, 58; 156/62.4, 156/167, 181, 308.2

[56] References Cited

U.S. PATENT DOCUMENTS

| 3,660,215 | 5/1972 | Pawlicki | 156/181 |
|---|---|---|---|
| 3,881,978 | 5/1975 | Livingston et al. | 156/247 |
| 3,888,716 | 6/1975 | Morse | 156/276 |
| 4,295,907 | 10/1981 | Cordts et al. | 156/246 |
| 4,302,495 | 11/1981 | Marra | 442/57 |
| 4,368,228 | 1/1983 | Gorgati | 428/110 |
| 4,469,543 | 9/1984 | Segal et al. | 156/283 |
| 4,472,243 | 9/1984 | Bondoc et al. | 162/135 |
| 4,491,617 | 1/1985 | O'Connor et al. | 428/236 |
| 4,539,254 | 9/1985 | O'Connor et al. | 428/236 |
| 4,617,219 | 10/1986 | Schupack | 442/57 |
| 4,762,744 | 8/1988 | Woiceshyn et al. | 462/219 |
| 4,780,350 | 10/1988 | O'Connor et al. | 428/109 |
| 4,812,349 | 3/1989 | Muelbeck | 428/138 |
| 4,871,605 | 10/1989 | Pagen et al. | 428/141 |
| 4,957,806 | 9/1990 | Pangrazi et al. | 428/224 |
| 4,992,315 | 2/1991 | Zickell et al. | 428/41 |
| 5,100,715 | 3/1992 | Zimmerman et al. | 428/147 |
| 5,130,178 | 7/1992 | Zerfass et al. | 428/198 |
| 5,151,146 | 9/1992 | Green | 156/177 |

*Primary Examiner*—Terrel Morris
*Attorney, Agent, or Firm*—Fitzpatrick, Cella, Harper & Scinto

[57] ABSTRACT

A preformed, unitary composite for reinforcing while suppressing curl in bituminous roofing membranes includes as a first layer, an open, non-woven grid of low shrinkage, continuous filament polyester yarns that are at low tension and adhesively secured together, and as a second layer, a lightweight, preformed fiberglass mat, the second layer being adhesively secured to one side of the first layer. The adhesive secures the two layers together such that at least some of the individual yarns of the first layer are at least partially coated and impregnated by the adhesive without forming a film that closes all openings through the composite. The adhesive that secures the continuous filament yarns of the first layer together and that secures the first and second layers together is a vulcanizable rubber binder, such as cross-linked styrene butadiene rubber, which includes about 50 to about 80% styrene. The composite is flexible, capable of being impregnated by bituminous material, and sufficiently strong to be useful in reinforcing such membranes. The composite, when used in reinforcing such membranes, suppresses curl in the membrane during and after forming the membrane. Also disclosed is a process for making such a composite.

32 Claims, No Drawings

PREFORMED UNITARY COMPOSITE FOR REINFORCING WHILE SUPPRESSING CURL IN BITUMINOUS ROOFING MEMBRANES AND PROCESS FOR MAKING SUCH COMPOSITES

BACKGROUND OF THE INVENTION

1. Field of the Invention

This invention relates to a preformed, unitary composite for reinforcing while suppressing curl in bituminous roofing membranes during and after forming the membrane, and to a process for making such a composite.

2. Description of the Related Art

In the manufacture of roofing membranes, a reinforcing sheet is saturated with bituminous material by leading the sheet through a tank or vat of heated bituminous material heated to about 275° F. to about 450° F. (135 to 232° C.) using methods which are known in the art. The bituminous material used in making these membranes has been a "modified bitumen" such as asphalt combined with about 20% by weight of atactic polypropylene or 5 to 25% styrene butadiene styrene rubber. The resulting combination is then rolled up for later installation, principally on flat roofs, using additional bituminous material and/or a torch or other source of heat to seal the joints.

By way of example, asphalt-like roofing membranes have been made from bituminous materials reinforced with three separate layers of reinforcing materials: a polyester mat, a non-woven fiberglass scrim held together with a thermosetting adhesive, and a fiberglass mat. We are using "mat" in its usual meaning of an entangled mass of filaments, preferably structures which are spun-bonded and "scrim" in its usual meaning of an open grid fabric.

Rather than being a preformed, unitary composite as in the present invention, often the foregoing reinforcing layers have been unwound from their respective separate rolls and led together through the bituminous material. This method has drawbacks. Often, the bituminous material will separate the layers in some or all of the reinforcement. Notably, the use of two or more reinforcements also results in misalignment of the respective layers during manufacture of the membrane and delamination during installation. The differential shrinkage and expansion rates of the various layers causes delamination of the layers, initially, when the membrane is being formed by the manufacturer, and, ultimately, while the membrane is being installed. Also, it is difficult to align the layers properly during manufacture. This results in waste of the misaligned portions of the membrane, which must be cut out and discarded. Accordingly, it is desirable to fabricate the composite before being led through the tank or vat of bituminous materials.

By utilizing preformed composites, the thickness and weight of each layer generally can be reduced because each one need not be self-supporting when it is subjected to stress at the time it is unwound and bituminous material is applied. Moreover, if desired, such a composite can have a reduced total thickness for the reinforcing layer, which results in less bituminous material being required. This reduction in material not only cuts costs, but increases ease of handling and reduces roof-loads when installed. The thinner reinforcing membrane and the resulting reduction in overall thickness also gives additional significant advantages beyond reduction in materials and weight. A thinner roofing membrane is less likely to crack or develop weakness during installation which could lead to leaks when it is made into rolls and stored, transported, unrolled, and applied to roofs. The thinner membrane results in more flexibility and is thus easier to conform to various configurations such as protuberances and parapets (the edge around the roof). This is particularly important in winter in colder climates. A single reinforcing layer also results in easier processing for the manufacturer, who need not be concerned with aligning separate reinforcing elements while they are led to and through the vats of bituminous material.

Some of the above-noted types of composites are described in U.S. Pat. No. 4,539,254, U.S. Pat. No. 4,762,744 and U.S. Pat. No. 4,780,350, each of which is commonly assigned to the assignee of this application.

The use of fiberglass in such composites has advantages in that fiberglass imparts strength, albeit for short elongation of the fibers. The use of polyester is advantageous in providing elongation of the fibers. To achieve the benefits of these components, prior composites required the use of three layers, in a sandwich arrangement, in which, for example, a laid scrim (say, of polyester) was bonded between two fiberglass mats to hold the laid scrim in place. This three layer arrangement was necessary because the adhesives used to hold the layers together were not strong enough to hold just two layers together, with one being a laid scrim and the other being a fiberglass mat, for example. Three layers, however, increase processing and manufacturing costs.

Many prior art composites also require thermoplastic binder to hold the layers together. We have found that thermoplastic binders will yield (soften) at high temperatures, such as those that arise in making the membrane. This causes delamination during the process of adding the modified bitumen. Further, the use of thermoplastic adhesives, as well as some thermosetting binders, require running the composite through a hot nip to secure the layers together. We have found that, when a fiberglass mat is used, the required nip pressures can crush and significantly weaken the fiberglass mat.

Preformed composites do away with the delamination and misalignment problems of separate layers discussed above, but introduce the problem of curl in the membrane. Curl can arise in the membrane during forming, when the layers are fed through the bitumen, due to the high temperatures involved and, as we have found, when one layer shrinks by a greater amount than another layer. Curl of the membrane also can be a problem during installation due to the memory characteristics of the components, especially when polyester is used. The problem of curl in the membrane becomes even more pronounced when only two layers are used in the composite. Nevertheless, it is desirable to make composites from two layers, since they tend to be even thinner and more flexible than three layer composites. Also, two layer composites can be made in a one or two step process rather than up to three steps.

Accordingly, a need has arisen to provide a two layer composite that has the advantages of polyester and fiberglass layers, but does not curl during and after forming of the membrane. There is an additional need for a process of making such a composite.

SUMMARY OF THE INVENTION

An object of this invention is to address the foregoing needs in the art and to provide a preformed, unitary composite for use in reinforcing while suppressing curl in bituminous roofing membranes.

Another object of the invention is to provide a composite essentially made from two layers that are adhesively secured together in which the first layer is an open, non-woven grid of polyester yarns that are adhesively secured together and the second layer is a fiberglass mat.

It is a further object to provide a process for making such a composite.

The present invention provides, in one aspect, a preformed, unitary composite for reinforcing while suppressing curl in bituminous roofing membranes, which includes as a first layer, an open, non-woven grid of low shrinkage, continuous filament polyester yarns that are at low tension and adhesively secured together, as a second layer, a lightweight, preformed fiberglass mat, the second layer being adhesively secured to one side of the first layer, the adhesive securing the two layers together such that at least some of the individual yarns of the first layer are at least partially coated and impregnated by the adhesive without forming a film that closes all openings through the composite.

Throughout this disclosure, we are using "at least partially" to modify both "coated" and "impregnated."

The present invention provides, in another aspect, a preformed, unitary composite for reinforcing while suppressing curl in bituminous roofing membranes, which includes as a first layer, an open, non-woven grid of low shrinkage continuous filament polyester yarns that are at low tension and adhesively secured together using cross-linked styrene butadiene rubber, which includes about 50 to about 80% styrene, the polyester yarns being in a range of 500 to 2000 denier, and as a second layer, a lightweight, preformed fiberglass mat in a weight range of from about 30 to about 300 grams per square meter, the second layer being secured to one side of the first layer using cross-linked styrene butadiene rubber, which includes about 50 to about 80% styrene, the adhesive securing the two layers together such that at least some of the individual yarns of the first layer are at least partially coated and impregnated by the adhesive without forming a film that closes all openings through the composite.

The present invention provides, in yet another aspect, a process for making a unitary composite to use in reinforcing while suppressing curl in roofing membranes. The process includes steps of selecting, as a first layer, an open, non-woven grid of low shrinkage, continuous filament polyester yarns that are at low tension, adhesively securing together the continuous filament yarns of the first layer using vulcanizable rubber binder while maintaining the non-woven grid open, selecting, as a second layer, a lightweight, preformed fiberglass mat and adhesively securing the first and second layers together using vulcanizable rubber binder to form a composite, such that at least some of the individual yarns of the first layer are at least partially coated and impregnated by the adhesive without forming a film that closes all openings through the composite.

The composite is flexible, capable of being impregnated by bituminous material, and sufficiently strong to be useful in reinforcing such membranes. Further, the composite, when used in reinforcing such membranes, suppresses curl in the membrane during and after forming the membrane.

In a preferred embodiment, the first layer is a laid scrim in which cross-machine direction yarns are laid between machine direction yarns at low tension. Specifically, we prefer that the tension be maintained to achieve no more than 1.5% stretch of the polyester yarns during the scrim-making process.

Notably, the composite of our invention, when used in reinforcing membranes, has significantly reduced (virtually no) overall shrinkage as well as significantly reduced (virtually no) relative shrinkage of the first and second layers.

We prefer that the low shrinkage polyester yarns have at most 3.0% shrinkage based on a hot air shrinkage (HAS) test at 350° F. for thirty minutes. It is more preferred that this shrinkage be at most 2.5% and most preferred that this shrinkage be at most 2.0%.

We prefer to secure together the continuous filament yarns of the first layer, and the first and second layers, using vulcanizable rubber binder, such as cross-linked styrene butadiene rubber, which preferably includes about 50% to about 80% styrene, and more preferably, about 65% to about 75% styrene, while around 70%, say on the order of 67%, is most preferred.

The foregoing and other objects, aspects, features and advantages of the present invention will become apparent from the following detailed description of the preferred embodiments.

DETAIL DESCRIPTION OF THE PREFERRED EMBODIMENTS

Our invention relates to a preformed, unitary, two-layer composite and a method of making such a composite for reinforcing while suppressing curl in bituminous roofing membranes, both during and after forming the membranes. Our composite, when used in reinforcing such membranes, has significantly reduced overall shrinkage as well as significantly reduced relative shrinkage of the first and second layers, both during and after forming of the membranes. We have found that these features are important in suppressing curl in the membranes, during and after forming the membranes, for reasons that will be discussed in more detail below.

Our composite, being preformed, has all the advantages of preformed composites discussed above. Moreover, the composite of this invention is thinner and more flexible than prior composites such as those of three or more layers. Thus, it is easier to install. In addition, although it is easier to work with, it is just as strong as prior composites such as those of three or more layers. Further, due to its construction, virtually no delamination or misalignment can occur between the layers.

The composite of this invention includes, as a first layer, an open, non-woven grid of low shrinkage continuous filament polyester yarns that are at low tension and adhesively secured together. Polyester yarns allow greater elongation (than can be achieved by fiberglass yarns), and thus provide tear resistance in the composite. Preferably, the first layer is a laid scrim. By "laid scrim" we mean an open grid fabric that is made by laying cross-machine direction yarns between the machine direction yarns in a single pass in a laid scrim machine. The machine and cross-machine direction yarns are adhesively secured together, as will be discussed in more detail below.

We provide as a second layer, a lightweight, preformed fiberglass mat. Fiberglass has advantageous properties of tensile strength (although for shorter elongation), thermal dimensional stability and resistance to wear and deterioration such as may be due to ultraviolet light. The second layer is adhesively secured to one side of the first layer, the adhesive securing the two layers together such that at least some of the individual yarns of the first layer are at least partially coated and impregnated by the adhesive without forming a film that closes all openings through the composite.

The composite is flexible, capable of being impregnated by bituminous material and sufficiently strong to be useful in reinforcing such membranes. Further, the composite, when used in reinforcing such membranes, suppresses curl in the membrane during and after forming the membrane.

The adhesive used in this invention provides additional advantages. Notably, the adhesive we have developed is compatible with modified asphalts, which improves bonding of (i) the machine and cross-machine direction yarns of the first layer, (ii) the two layers together and (iii) the modified asphalt to our composite. Further, we prefer to use a thermosetting adhesive, which does not require running the product through a hot nip when making the composite, as is necessary with thermoplastic adhesive. The avoidance of using a hot nip is important because the pressure used in a hot nip can crush and significantly weaken the fiberglass mat. Also, we avoid the use of thermoplastic adhesives, which can yield (soften) at the high temperatures of the modified bitumen and cause delamination, as discussed above.

Further, since we use a thermosetting adhesive to bind the continuous filament yarns of the first layer together, as well as to bind the first and second layers of the composite together, the composite has an advantage of being adaptable to a wider variety of processing conditions and equipment than when a thermoplastic resin is the binder. In addition, with thermosetting resins, it is possible to make thicker and/or stiffer composites, which is desirable in some uses for roofing membranes.

The words "thermosetting adhesive" are used herein to mean a thermosetting adhesive which maintains its bonding ability and stiffness up to 450° F., that is to say, a thermosetting adhesive which is not tacky and soft at about 450° F. In accordance with this definition, it will be understood that some thermosetting adhesives, if not suitably cross-linked, may fail to acquire the necessary thermoset adhesive properties, i.e., may act as thermoplastic adhesives.

We prefer to use as the thermosetting adhesive vulcanizable rubber binder to secure the continuous filament yarns of the first layer together. Likewise, we prefer to use vulcanizable rubber binder to adhesively secure the first and second layers together. This adhesive will be discussed in more detail below.

It has been known to coat scrims with a thermoplastic adhesive such as polyvinyl chloride ("PVC") latex adhesive or PVC plastisol adhesive. However, we prefer not to use scrims coated with such adhesives in this invention. We have found that PVC latex adhesive, for example, tends to yield (soften) at low temperature and is not thermosetting, as is desired in our invention. We have found, therefore, that composites formed from such PVC latex adhesives tend to pull apart in subsequent processing.

For the first layer in our composite, we prefer to use an open, non-woven grid of low shrinkage, continuous filament polyester yarns that are at low tension and adhesively secured together. We have found that the use of the polyester yarns at both low shrinkage and low tension are important factors in achieving our desired results of curl suppression.

By "low shrinkage" we mean yarns that have at most 3.0% shrinkage as measured in a hot air shrinkage (HAS) test at 350° F. In such a test, a given length of yarns are placed in a hot air oven at 350° F. of for thirty minutes, without tension. At 3.0% shrinkage, 97.0% of the length of the material would remain after the test. It is more preferred that this shrinkage be at most 2.5% and most preferred that this shrinkage be at most 2.0%. For example, we have successfully tested "low shrinkage yarns" which have about 2.5% shrinkage at 350° F. and "ultra low shrinkage yarns" which have about 1.6% shrinkage at 350° F. For ease of discussion, we are defining "low shrinkage" yarns as yarns having at most 3.0% shrinkage. Accordingly, yarns having shrinkage below 3.0% are included in this definition. Such low shrinkage yarns are more expensive than standard polyester yarns. Thus, conventional cost-cutting wisdom would not suggest the use of low shrinkage polyester yarns, as in our invention. By way of comparison, standard polyester yarns have a shrinkage on the order of 3.4% and higher at 350° F. We found that such yarns, although less expensive, do not achieve our desired results. We also prefer to use 500 to 2000 denier (550 dtex to 2200 dtex) with 1000 denier (1100 dtex) polyester yarns being most preferred. Such 1000 denier "low shrinkage" and "ultra low shrinkage" polyester yarns are available from Hoechst Celanese in the United States by No. 780 and No. 710 respectively.

As discussed above, we prefer to use a laid scrim as the first layer, in which one layer of yarns, say in the cross-machine direction, are laid between another layer of yarns, say in the machine direction. The cross-machine direction yarns are laid between the machine direction yarns at a substantial angle, such as at an angle in a range of forty-five to ninety degrees. However, one having ordinary skill in the art recognizes that this angle can be varied as desired. We prefer that the polyester yarn in the laid scrim be at very low tension. We set the tension so that shrinkage of the first layer is sufficiently equal to that of the second layer during and after forming the membrane. Shrinkage of the second layer, being a fiberglass mat, is closer to zero than to 1%.

To set tension in a laid scrim process, it is known to use weights on the ends of machine direction yarn beams to cause tension on the yarns. Specifically, a pulley rope is draped over each beam. The weights are hooked onto the pulley rope. As the beam turns, the rope causes drag in proportion to the weights on the rope. This provides the desired tension on the yarns. In manufacturing conventional laid scrim fabric, typically 6 to 8 weights of 3 to 5 pounds each are used on each beam. However, in the present invention, we prefer to use 2 to 3 weights of 3 to 5 pounds each. Otherwise, we have found that the fabric will tend to stretch. In more detail, we prefer to maintain this tension to achieve no more than 1.5% (roughly ¼" over 18") stretch of the yarns during the scrim making process. We have found that this is an important factor in suppressing curl during and after forming of the membrane using our composite.

We prefer to use a fiberglass mat as the second layer. The fiberglass mat may be formed on a paper-type machine (by what is known as a wet process), or it may be a resin-bonded (a so-called dry process) staple or continuous filament mat and is preferably isotropic. The fiberglass mat may preferably range in weight from about 30 to about 300 grams per square meter, with 30 to 150 grams being more preferred and 50 to 100 being the most preferred.

In our invention, we prefer to adhesively secure the filament yarns of the first layer together using a vulcanizable rubber binder and to adhesively secure the first and second layers together using such a vulcanizable rubber binder. We prefer to use as the vulcanizable rubber binder cross-linked styrene butadiene rubber, which includes about 50% to about 80% styrene. We have found that about 65% to about 75% styrene is more preferred, while around 70%, say on the order of 67% styrene is most preferred. We have found that such styrene butadiene rubber latexes are capable of later modification by the cross-linking components of this type of thermosetting adhesive. It is necessary to have enough double bonds that can be cross-linked, for example, such that a sulphur linkage may be established between one polymer chain and an adjacent one. We have found that the compressive strength of the adhesive in our composite also assists in suppressing curl during and after forming of roofing membranes using our composite.

While styrene butadiene rubber latexes are preferred, other cross-linking adhesives, such as acrylics, neoprenes and nitriles (such as acrylonitrile containing latexes), may be used. We have found that the use of urea formaldehyde (UF) is less preferred, since its use tends to make a stiff product. Further, composites made using UF can tend to delaminate when put through the bitumen. Also, although we prefer to use the same adhesive for securing the yarns of the first layer together and for securing the first and second layers together, one having ordinary skill in the art recognizes that the same adhesive need not be used. Rather, different adhesives could be used to achieve the same result.

By way of example, we prefer to use the following components in the adhesive:

TABLE

| Component | Parts Dry |
| --- | --- |
| BAS Styrofan ® ND 565-67% styrene | 100 |
| Sunpro NRW-3 (surfactant) | 2.7 |
| Monsanto Styiner S (with ammonia) | 5.2 |
| zinc oxide | 1.8 |
| sulfur | 1.8 |
| Setsit 104 (vulcanization accelerator) | 0.19 |
| black colorant | 3.5 (optional) |
| miscellaneous (water or volatiles) | 0.6 |

The Setsit 104 is available from R.T. Vanderbilt in Providence, R.I. and is activated zinc dithiocarbamate.

It is desired that the latexes vulcanize well, are sufficiently strong and do not block (self-stick). It is also desirable to have the proper balance between the Stymer S and the NRW-3 to achieve the desired application viscosity. The Stymer S (styrene/maleic anhydride copolymer) is a water loving thickener and beneficial for ease of processing. Notably, if the adhesive has dried on the application (padder) rolls to a certain extent, this product allows remoistening and reemulsifying. That is, it tends to keep the adhesive in a non-coalesced condition for a suitable period of time. The NRW-3 helps to hold the film open, without impairing the water sensitivity of the final film. Too much Stymer S would cause too high a viscosity, while too much NRW-3 would cause too low a viscosity.

Expressed as percent solids in the final adhesive mixture, we prefer a range on the order of about 30 to about 45% solids on an overall weight basis of the total weight of the coating material (the balance is water and other materials that dissipate in later processing). However, depending on the application, the percent solids may go as low as 20% total weight of liquid adhesive before it is dried and cured. Also, the higher the percentage of solids, the faster the padder rolls will dry, during temporary machine stoppages.

For example, with respect to the TABLE discussed above, the latex (ND 565) is supplied at 53% solids, the Stymer at 43%, the NRW-3 at 30%, while sulfur is 67% active in water and the zinc oxide is 60% active in water. The volatile materials primarily will be water, ammonium hydroxide and others. These are driven off in production. Also, it should be noted that the colorant is optional, but has come to be preferred in the trade.

In our process for making a composite to use in reinforcing while suppressing curl in roofing membranes we select, as a first layer, an open, non-woven grid of low shrinkage, continuous filament polyester yarns that are at low tension. We prefer to use polyester yarns having a shrinkage at most 3.0% as measured in a hot air shrinkage (HAS) test at 350° F. It is more preferred that this shrinkage be at most 2.5% and most preferred that this shrinkage be at most 2.0%. In this process, a scrim of polyester yarns is produced on a standard scrim machine by laying yarns in the cross-machine direction between yarns in the machine direction at a substantial angle to the other. This angle may be on the order of forty-five to ninety degrees, but could be varied as desired. As discussed above, we use low tension in the yarns. Specifically, we prefer to maintain the tension to achieve no more than 1.5% stretch of the yarns during the scrim making process. Then, we apply a vulcanizable rubber binder to hold the fabric together, as well as to resist any excess shrinkage during the process of drying the binder.

The open grid coated with adhesive is fed over a steam heated dry can or roll on the order of 24 to 60 inches in diameter to set the adhesive. The adhesive is applied to the yarns at ambient plant temperature and set (cured) at a sufficient dwell time, on the order of 30 to 60 seconds being preferred (and about 45 seconds being more preferred), at a temperature on the order of 300 plus or minus 20° F. The temperature of the heated roll and the running speed may be adjusted by those skilled in the art to obtain thorough drying and curing of the adhesive.

Once the adhesive binder is set, the open grid fabric may be rolled up and taken to a second step where it is unrolled and more binder is applied and it is mated with a fiberglass mat having those properties discussed above. Alternatively, rather than batch, the process may be a one-step, continuous process in which the fiberglass mat is added to the open grid before the adhesive binder used to secure the open grid together sets. As one having ordinary skill in the art will appreciate, other equivalent one-step, continuous processes may be used.

The mated layers are then passed over additional dry cans or rolls to dry and set the binder and form the composite. In this portion of the process, three, for example, drying rolls may be used. We have found that it is important that the composite be in contact with the steam heated drying rolls for vulcanization to occur, with conduction of heat from the rolls to the composite being a key factor. As with the first heated roll, the additional rolls are set at a temperature on the order of 300 plus or minus 20° F., with a sufficient dwell time, on the order of 30 to 60 seconds being preferred (and about 45 seconds being more preferred). Again, the temperature of the heated rolls and the running speed may be adjusted by those skilled in the art to obtain thorough drying and curing in order to obtain maximum adhesion between the layers.

In applying the adhesive, we prefer to use rubber covered application (padder) rollers. In making the first layer, we prefer to apply adhesive in an amount of 30 to 80 percent DPU (dry weight pickup) based on the weight of the polyester fabric. In adhesively securing the first and second layers together, adhesive is added by an amount of 10 to 40 percent DPU based on the formed composite.

We have found that our composite suppresses curl in cooling membranes during and after forming the membrane. Curl in the membranes arises when one layer shrinks by a greater amount than the other during or even after forming the membrane. When using fiberglass as one of the layers, which exhibits little to no shrinkage (closer to zero than to 1% shrinkage in manufacturing a composite having a fiberglass layer), it is necessary for the other layer also not to shrink, or to exhibit comparably little to no shrinkage. Our composite, when used in reinforcing the membranes has significantly reduced (virtually no) overall shrinkage as well as significantly reduced (virtually no) relative shrinkage of the first and second layers. We have found that our composite exhibits far better curl suppression by first starting with low shrinkage polyester yarns, which are arranged in a grid at low tension, and restricting their movement further by an adhesive coating that has sufficient strength in compression to accomplish this, and securing this grid to a fiberglass mat using the same or comparable adhesive.

Although we have discussed a two layer composite above, one having ordinary skill in the art recognizes that an additional layer, such as a fiberglass mat or scrim, for example, could be added, if desired, provided the principles of our invention are followed. cold adhesive or other appropriate methods. It may be fully adhered, loose laid or mechanically fastened to the roof, for example.

The scope of the invention is not limited by the discussion above, but only by each of the following claims, which should be interpreted as broadly as possible to encompass all modifications and equivalent structures without encompassing the prior art or invalidating the claim.

We claim:

1. A preformed, unitary composite for reinforcing while suppressing curl in bituminous roofing membranes, the composite consisting essentially of:
    as a first layer, an open, non-woven grid of low shrinkage, continuous filament polyester yarns that are at low tension and adhesively secured together; and
    as a second layer, a lightweight, preformed fiberglass mat, the second layer being adhesively secured to a side of the first layer, the adhesive securing the two layers together such that at least some of the individual yarns of the first layer are at least partially coated and impregnated by the adhesive without forming a film that closes all openings through the composite,
    wherein the composite is flexible, capable of being impregnated by bituminous material, and sufficiently strong to be useful in reinforcing such membranes, and the composite, when used in reinforcing such membranes, suppresses curl in the membrane during and after forming the membrane.

2. A composite according to claim 1, in which the polyester yarns have a shrinkage of at most 3.0% at 350° F.

3. A composite according to claim 1, in which the first layer is a laid scrim in which cross-machine direction yarns are laid between machine direction yarns.

4. A composite according to claim 3, in which the polyester yarns in the laid scrim have a shrinkage of at most 3.0% at 350° F.

5. A composite according to claim 4, in which the low tension is set to achieve no more than 1.5% stretch of the yarns of the first layer.

6. A composite according to claim 1, in which the composite, when used in reinforcing the membranes, has significantly reduced overall shrinkage as well as significantly reduced relative shrinkage of the first and second layers.

7. A composite according to claim 1, in which the adhesive that secures the continuous filament polyesters yarns of the first layer together is a vulcanizable rubber binder.

8. A composite according to claim 7, in which the vulcanizable rubber binder suppresses shrinkage of the yarns of the first layer.

9. A composite according to claim 7, in which the vulcanizable rubber binder is cross-linked styrene butadiene rubber, which includes about 50 to about 80% styrene.

10. A composite according to claim 7, in which the vulcanizable rubber binder is cross-linked styrene butadine rubber, which includes about 65 to about 75% styrene.

11. A composite according to claim 1, in which the adhesive that secures the second layer to the first layer is a vulcanizable rubber binder.

12. A composite according to claim 11, in which the vulcanizable rubber binder is cross-linked styrene butadiene rubber, which includes about 50 to about 80% styrene.

13. A composite according to claim 11, in which the vulcanizable rubber binder is cross-linked styrene butadiene rubber, which includes about 65 to 75% styrene.

14. A preformed, unitary composite for reinforcing while suppressing curl in bituminous roofing membranes, the composite consisting essentially of:
    as a first layer, an open, non-woven grid of low shrinkage, continuous filament polyester yarns that are at low tension and adhesively secured together using cross-linked styrene butadiene rubber, which includes about 50 to about 80% styrene, the polyester yarns being in a range of 500 to 2000 denier; and
    as a second layer, a lightweight preformed fiberglass mat in a weight range of from about 30 to about 300 grams per square meter, the second layer being secured to a side of the first layer using cross-linked styrene butadiene rubber, which includes about 50 to about 80% styrene, the adhesive securing the two layers together such that at least some of the individual yarns of the first layer are at least partially coated and impregnated by the adhesive without forming a film that closes all openings through the composite,
    wherein the composite is flexible, capable of being impregnated by bituminous material, and sufficiently strong to be useful in reinforcing such membranes, and the composite, when used in reinforcing such membranes, suppresses curl in the membrane during and after forming the membrane.

15. A composite according to claim 14, in which the polyester yarns have a shrinkage of at most 3.0% at 350° F.

16. A composite according to claim 14, in which the polyester yarns have a shrinkage of at most 2.5% at 350° F.

17. A composite according to claim 14, in which the polyester yarns have a shrinkage of at most 2.0% at 350° F.

18. A composite according to claim 14, in which the low tension is set to achieve no more than 1.5% stretch of the yarns at the first layer.

19. A composite according to claim 14, in which the adhesive that secures the yarns of the first layer together and the adhesive that secures the first and second layer together includes about 65% to about 75% styrene.

20. A composite according to claim 19, in which the adhesive primarily includes, on a dry basis, 100 parts styrene, 2.7 parts surfactant, 5.2 parts of a styrene/maleic anhydride copolymer, 1.8 parts zinc oxide, 1.8 parts sulfur, and 0.19 parts a vulcanization accelerator.

21. A process for making a unitary composite to use in reinforcing while suppressing curl in bituminous roofing membranes, the process comprising the steps of:
    selecting, as a first layer, an open, non-woven grid of low shrinkage, continuous filament polyester yarns that are at low tension;
    adhesively securing together the continuous filament yarns of the first layer using vulcanizable rubber binder while maintaining the non-woven grid open;

selecting, as a second layer, a lightweight, preformed fiberglass mat;

adhesively securing the first and second layers together using vulcanizable rubber binder to form a composite, such that at least some of the individual yarns of the first layer are at least partially coated and impregnated by the adhesive without forming a film that closes all openings through the composite, wherein the composite is flexible, capable of being impregnated by bituminous material, sufficiently strong to be useful in reinforcing such membranes, and the composite, when used in reinforcing such membranes, suppresses curl in the membrane during and after forming the membrane.

22. A process according to claim 21, wherein said step of selecting the first layer comprises selecting a laid scrim in which cross-machine direction yarns are laid between machine direction yarns.

23. A process according to claim 21, in which the polyester yarns have a shrinkage of at most 3.0% at 350° F.

24. A process according to claim 21, in which the polyester yarns have a shrinkage of at most 2.5% at 350° F.

25. A process according to claim 21, in which the polyester yarns have a shrinkage of at most 2.0% at 350° F.

26. A process according to claim 21, in which the low tension is set to achieve no more than 1.5% stretch of the yarns of the first layer.

27. A process according to claim 21, in which the composite, when used in reinforcing the membranes, has significantly reduced overall shrinkage as well as significantly reduced relative shrinkage of the first and second layers.

28. A process according to claim 21, in which the vulcanizable rubber binder that secures the yarns of the first layer together and that secures the first and second layers together is cross-linked styrene butadiene rubber, which includes about 50 to about 80% styrene.

29. A process according to claim 28, in which the cross-linked styrene butadiene rubber includes about 65 to about 75% styrene.

30. A process according to claim 21, in which the vulcanizable rubber binder suppresses shrinkage of the yarns of the first layer.

31. A process according to claim 21, in which the process is a one-step, continuous process.

32. A process according to claim 21, in which the process is a batch process wherein the first layer is adhesively secured together and at least partially dried to form an intermediate product prior to being adhesively secured together with the second layer.

* * * * *